United States Patent
Kölbl et al.

(10) Patent No.: US 11,291,963 B2
(45) Date of Patent: Apr. 5, 2022

(54) DEVICE AND METHOD FOR PRODUCING A READY-TO-USE SOLUTION FROM A CONCENTRATE

(71) Applicant: WASHTEC HOLDING GMBH, Augsburg (DE)

(72) Inventors: Ulrich Kölbl, Friedberg (DE); Michael Schwärzer, Aindling (DE); Helmut Oswald, Friedberg (DE); Franz Kiser, Ried (DE); Stefan Mayer, Neusäss (DE)

(73) Assignee: WashTec Holding GmbH, Augsburg (DE)

( * ) Notice: Subject to any disclaimer, the term of this patent is extended or adjusted under 35 U.S.C. 154(b) by 193 days.

(21) Appl. No.: 16/070,844

(22) PCT Filed: Jan. 17, 2017

(86) PCT No.: PCT/EP2017/050902
§ 371 (c)(1),
(2) Date: Jul. 18, 2018

(87) PCT Pub. No.: WO2017/125393
PCT Pub. Date: Jul. 27, 2017

(65) Prior Publication Data
US 2019/0022613 A1    Jan. 24, 2019

(30) Foreign Application Priority Data
Jan. 22, 2016   (DE) .................... 10 2016 000 596.3

(51) Int. Cl.
*B01F 5/04*    (2006.01)
*B01F 13/10*    (2006.01)
(Continued)

(52) U.S. Cl.
CPC ........ *B01F 13/103* (2013.01); *B01F 3/04446* (2013.01); *B01F 3/0865* (2013.01);
(Continued)

(58) Field of Classification Search
CPC ....................................................... B01F 5/04
(Continued)

(56) References Cited

U.S. PATENT DOCUMENTS

| 4,533,123 A | 8/1985 | O'Leary |
| 4,648,043 A | 3/1987 | O'Leary |

(Continued)

FOREIGN PATENT DOCUMENTS

| DE | 69931170 T2 | 2/2007 |
| EP | 1008380 A2 | 6/2000 |
| FR | 1532742 A | 7/1968 |

OTHER PUBLICATIONS

International Search Report dated Jul. 7, 2017 for PCT/EP2017/050902 filed Jan. 17, 2017.

(Continued)

*Primary Examiner* — David L Sorkin
(74) *Attorney, Agent, or Firm* — Paul D. Bianco; Gary S. Winer; Fleit Intellectual Property Law

(57) ABSTRACT

A device and related method for producing a ready-to-use solution from a concentrate and a diluent includes an inlet for the diluent; an inlet for the concentrate; an outlet for the solution; a line extending from the inlet for the diluent via a confluence where diluent and concentrate meet, to the outlet; a mixing container arranged in the line between the confluence and the outlet and having a larger cross-section than parts of the line, which are arranged upstream and downstream of the mixing container; and a metering pump for the concentrate, which is connected on the suction side to the inlet for the concentrate and on the pressure side to the (Continued)

confluence and which operates in a pulsed manner. The metering pump works with a clock frequency, in which a plurality of pump surges are attributable to the dwell time of the liquid in the mixing container.

18 Claims, 1 Drawing Sheet

(51) Int. Cl.
| | |
|---|---|
| *B01F 5/02* | (2006.01) |
| *B01F 5/06* | (2006.01) |
| *B01F 7/02* | (2006.01) |
| *B01F 15/00* | (2006.01) |
| *B01F 15/02* | (2006.01) |
| *B01F 3/04* | (2006.01) |
| *B01F 3/08* | (2006.01) |
| B60S 3/04 | (2006.01) |
| B01F 5/00 | (2006.01) |

(52) U.S. Cl.
CPC .......... *B01F 5/0212* (2013.01); *B01F 5/0268* (2013.01); *B01F 5/0451* (2013.01); *B01F 5/0618* (2013.01); *B01F 5/0654* (2013.01); *B01F 7/02* (2013.01); *B01F 13/1033* (2013.01); *B01F 15/005* (2013.01); *B01F 15/024* (2013.01); *B01F 2005/0017* (2013.01); *B01F 2005/0034* (2013.01); *B01F 2005/0639* (2013.01); *B60S 3/047* (2013.01)

(58) Field of Classification Search
USPC ................................ 366/181.5, 181.8, 182.2
See application file for complete search history.

(56) References Cited

U.S. PATENT DOCUMENTS

| | | | |
|---|---|---|---|
| 4,814,073 A | 3/1989 | Shouldice | |
| 6,293,290 B1 | 9/2001 | Bruce | |
| 6,314,996 B1* | 11/2001 | Borglum | A01B 69/022 |
| | | | 137/565.29 |
| 7,448,790 B2* | 11/2008 | Tessien | B01J 19/008 |
| | | | 366/114 |
| 7,513,681 B2* | 4/2009 | Kingsford | B01F 5/0644 |
| | | | 137/599.01 |
| 2004/0065682 A1 | 4/2004 | Floyd et al. | |
| 2013/0260462 A1* | 10/2013 | Wood | B01F 3/04099 |
| | | | 435/375 |
| 2016/0184786 A1* | 6/2016 | De Corral | B01F 3/0861 |
| | | | 366/181.5 |

OTHER PUBLICATIONS

Written Opinion for PCT/EP2017/050902 filed Jan. 17, 2017.
International Preliminary Report on Patentability for PCT/EP2017/050902 filed Jan. 17, 2017.
International Preliminary Report on Patentability for PCT/EP2017/050902 filed Jan. 17, 2017 (English translation).

* cited by examiner

DEVICE AND METHOD FOR PRODUCING A READY-TO-USE SOLUTION FROM A CONCENTRATE

FIELD OF THE INVENTION

The present invention relates to a device for producing a ready-to-use solution from a concentrate and a diluent, typically water. This type of device can be used, e.g., in a vehicle wash facility for producing a solution which can be used for washing, waxing or other applicable surface treatments potentially suitable for washing a car.

BACKGROUND OF THE INVENTION

To save packaging and transport costs, manufacturers and users in most cases are interested in concentrates with as low a solvent content as possible. Concentrates of this type tend to be viscous and to resist being remixed with a diluent. When injected into a stream of the solvent, the solvent and the concentrate may travel relatively long distances without being homogeneously mixed. Homogeneous mixing, however, is a prerequisite for ensuring the usability of the diluted solution.

US 2004/0065682 A1 therefore describes a device for producing a ready-to-use solution in which the concentrate and the diluent converge and are blended in an open storage tank. To subsequently spray the solution onto a vehicle requires a powerful pump which is able to pump a large amount of solution within a short time against the pressure required for spray applications.

SUMMARY OF THE INVENTION

One aspect of the present invention relates to a device and a method, which, while using simple and inexpensive means, are capable of producing a ready-to-use solution under positive pressure that is required for dispersing the solution.

Advantageous embodiments and refinements of the device and method according to the invention are disclosed herein.

In an embodiment, a device for producing a ready-to-use solution from a concentrate and a diluent, comprises
  an inlet for the diluent,
  an inlet for the concentrate,
  an outlet for the solution, a line which extends from the inlet for the diluent to the outlet via a confluence, at which the diluent and the concentrate converge,
  a mixing container which is disposed in the line between the confluence and the outlet and which has a larger cross section than parts of the line disposed upstream and downstream of the mixing container, and
  a metering pump for the concentrate, which is connected on the suction side to the inlet for the concentrate and on the pressure side to the confluence and which operates in pulsed mode, the metering pump operates at a clock frequency in which a plurality of pump surges are attributable to the dwell time of the liquid in the mixing container.

A pump surge is intended to refer especially to a pump pulse or a metering pulse, at which a specific volume of the concentrate is metered into a volume flow of the diluent.

According to one embodiment of the device according to the present invention, the line is designed so as to be pressure-proof.

Although the metering pump has to be able to pump against positive pressure, the amount to be delivered, however, is considerably smaller than when the entire solution has to be pumped. Thus, it suffices to use an inexpensive pump with a low delivery rate. The large cross section of the mixing container compensates for the laminar flow effect and promotes thorough mixing of the concentrate and the solvent, thereby ensuring that a homogeneous solution is obtained at the outlet.

Since mixing in the mixing container takes place in continuous flow while the concentrate and the solvent are being added, the mixing container need not be large; its volume can be a small fraction of the amount of ready-to-use solution required for a treatment application on a vehicle. If the pressure at the inlet for the diluent is predefined, the throughput through the line is substantially determined by the shape of the line. If a nominal pressure recommended by the manufacturer for the operation prevails at the inlet, e.g., 4 bar, such as is generally present in the connector pipes of the public water supply systems, this throughput per minute, i.e., a volume of liquid passing per minute through a cross section, can be many times the volume of the mixing container, i.e., during the course of one minute the content of the mixing container is replaced multiple times.

The throughput through the line per minute preferably measures between 10 to 20 times the volume of the mixing container. A throughput per minute of more than 20 times the volume of the mixing container would lead to such a short dwell time in the mixing container that the homogeneity of the mixing process would be impaired. If the throughput per minute were to be smaller than 10 times the volume, either the time it would take to prepare the quantity of solution required to treat a vehicle would be undesirably long or the volume of the mixing container would have to be so large that the required device would be unwieldy and expensive.

The mixing container is able to balance not only space, but also time inhomogeneities in the composition of its inflows. To meter the concentrate, it is therefore possible to use an inexpensive pump operating in pulsed mode; however, the clock frequency of the pump should be in a range of 1 Hz to 10 Hz or a multiple of 10 Hz.

According to an embodiment of the device of the present invention, the inlet for the diluent is designed to ensure that the throughput D through the line along the section between the inlet for the diluent and the confluence has a defined value. In addition, the clock frequency f is assigned to the metering pump. Thus, in the device according to the present invention, the volume V of the mixing container is $$V = \frac{k \cdot D}{f},$$

where the parameter k is in a range of 1 to 15, preferably in a range of 4 to 8.

In the device according to the present invention, the concentrate in conjunction with the diluent is metered into the line in pulsed mode. As a result, after metering in the concentrate, the concentration of the concentrate in the diluent is not homogeneous. Inhomogeneities across the cross section of the line and inhomogeneities in the direction of flow, also referred to as time inhomogeneities, are observed. An advantage of using the mixing container of the device according to the present invention is that homogenization in the direction of flow, i.e., temporal homogenization, can be reached. Thus, the mixing container also functions as a pulsation damper.

When the concentrate and the diluent are mixed in the flow direction, a long dwell time of the liquid mixture in the mixing container is important. In the device according to the present invention, the volume of the mixing container is therefore determined as a function of the clock frequency at which the concentrate is metered into the line. In addition, the volume of the mixing container also depends on the throughput through the line. At a minimum, the volume of the container should be large enough to ensure that the mixing container is able to completely hold a metering pulse that is to be mixed into the volume flow of the diluent. Thus, the parameter k referred to above specifies the number of pump surges that are to be introduced into the volume flow of the diluent. The parameter k should therefore be at least 1; however, it is preferably in a range of 1 to 15, especially in a range of 4 to 8. Thus, in this case, a plurality of cycles of the concentrate metered into the mixing container are mixed with the diluent in the flow direction. In the mixing container, backmixing and temporal homogenization take place.

Also important to temporal homogenization of the liquid mixture in the mixing container is the form factor of the mixing container. The container should not be too elongated, since otherwise the flow through the container would be simply linear. A factor especially relevant to the geometry of the mixing container is the ratio of length to width of the mixing container.

According to an embodiment of the device disclosed by the present invention, the interior space of the mixing container extends longitudinally in the flow direction and transversely in a direction at right angles with respect to the flow direction. The ratio of the maximum longitudinal dimension of the mixing container to the maximum transverse dimension of the mixing container is in particular in a range of 0.5 to 5, preferably in a range of 1 to 4 and most preferably in a range of 2 to 3. In a circular cylindrical mixing container, the maximum longitudinal dimension is the length of the interior space of the cylindrical mixing container, and the maximum transverse dimension is the internal diameter of the mixing container.

Another important factor is the geometry of the inlet and outlet opening relative to the geometry of the mixing container. The inlet opening is also referred to as the entrance to the mixing container, and the outlet opening is referred to as the exit from the mixing container. The selected geometry should cause the inflowing liquid mixture to be subjected to the strongest possible turbulence. This can be implemented by ensuring that the liquid mixture is not introduced symmetrically.

According to an embodiment of the device disclosed by the present invention, the mixing container has a cylindrical shape, and in the upstream direction, the mixing container has an inlet opening in one end surface, and in the downstream direction, it has an outlet opening in the other end surface. In that case, the inlet opening and the outlet opening, relative to an axis of the cylindrical mixing container, are offset with respect to one another. For example, relative to the axis of the cylindrical mixing container, they can be disposed opposite to one another on the respective end surfaces.

According to another embodiment of the device disclosed by the present invention, the ratio of the surface area of the inlet opening to the mean cross-sectional area of the mixing container is in a range from $1/30$ to $1/200$. This area ratio determines the velocity of the liquid mixture flowing into the mixing container. A larger ratio leads to stronger backmixing of the inflowing liquid mixture with the liquid mixture previously fed into the mixing container and already present in the mixing container.

To make the mixing process in the mixing container more effective, various auxiliary devices are available, which can each be used alone or in combination with each other.

A first auxiliary device of this type is a pipe connector at the entrance to the mixing container. By projecting into mixing container, this pipe connector promotes the detachment of the liquid flowing into the mixing container from the walls of the mixing container and thereby the formation of turbulence.

Another possibility is to dispose a nozzle on the entrance to the mixing container. By narrowing the cross section of flow, the nozzle forces the inflowing liquid to increase its velocity, which promotes its turbulence in the mixing container.

To promote turbulence in the mixing container, it is also possible to dispose a baffle plate on one entrance of the mixing container.

A swirl generator in the line between the confluence and the mixing container can improve the mixing of the concentrate and the solvent even before they enter the mixing container.

If, in particular at a high viscosity of the concentrate, the above-mentioned auxiliary devices, which do not require movable components, are not sufficiently effective, it may be necessary to incorporate a driven agitator blade into the mixing container.

To discharge pressure in the line when the device is not in use, a shut-off valve can be disposed between the inlet for the diluent and the confluence.

In practice, the diluent in most cases is water, and the inlet for the diluent is connected to a water supply system. This system can be a public water supply system; however, if the device is used in a vehicle wash facility, the use of an internal supply system of the vehicle wash facility operating with recycled water is another option to be considered.

The storage tank for the concentrate should be replaceably connected to the inlet for the concentrate. In order to be able to replace the storage tank for the concentrate without risk, it should be possible, as mentioned above, to discharge pressure in the line.

According to a preferred application, a foam generator is disposed downstream of the mixing container so as to allow the solution to be foamed before it is applied to a vehicle. In that particular case, the spatial and temporal homogeneity of the solution, which can be achieved with the use of the mixing container, is especially important, since without the mixing container, despite the fact that water would start flowing as soon as the valves are opened, the metering pump would first have to build up the necessary pressure before any concentrate could be added. This difference in timing would have the effect that each time the system is switched on, essentially clear water would first be fed into the foam generator, which water itself cannot be foamed, but which, once it wets the vehicle, would impair adhesion of the subsequently exiting foam to the vehicle. In contrast, using the mixing container ensures that the foam generator invariably receives only solution which contains a sufficiently large amount of concentrate so as to be able to foam well and to provide a stable foam that adheres well to the vehicle.

The present invention further relates to a vehicle wash facility in which a device of the type described above is used to apply a treatment solution to a vehicle.

The method for producing a ready-to-use solution from a concentrate and a diluent provides for the diluent to be fed into a line. At a point of confluence in the line, the concentrate is added by means of the metering pump in pulsed mode at a defined clock frequency. The liquid mixture of the diluent and the concentrate is fed into a mixing container which is disposed in the line between the confluence and an outlet for the solution and which has a larger cross section than parts of the line located upstream and downstream of the mixing container. The method is characterized in that the volume V of the mixing container is $$V = \frac{k \cdot D}{f}$$

where D stands for the throughput through the line in a section between the inlet for the diluent and the confluence, f stands for the clock frequency of the metering pump, and the parameter k is in a range from 1 to 15, preferably in a range from 4 to 8. In that case, in particular the clock frequency of the metering pump is such that a plurality of pump surges are attributable to the dwell time of the liquid mixture in the mixing container.

Using the method according to the present invention ensures that the liquid mixture of the diluent and the concentrate is sufficiently homogenized in the mixing container, both in the transverse direction and in the longitudinal direction, i.e., in the direction of flow of the liquid mixture. Thus, temporal homogenization of the liquid mixture is achieved as well.

BRIEF DESCRIPTION OF THE DRAWINGS

Additional characteristics and advantages of the invention follow from the description of embodiment examples below with reference to the appended drawings. The drawings show.

DETAILED DESCRIPTION OF THE INVENTION

Figure 1:
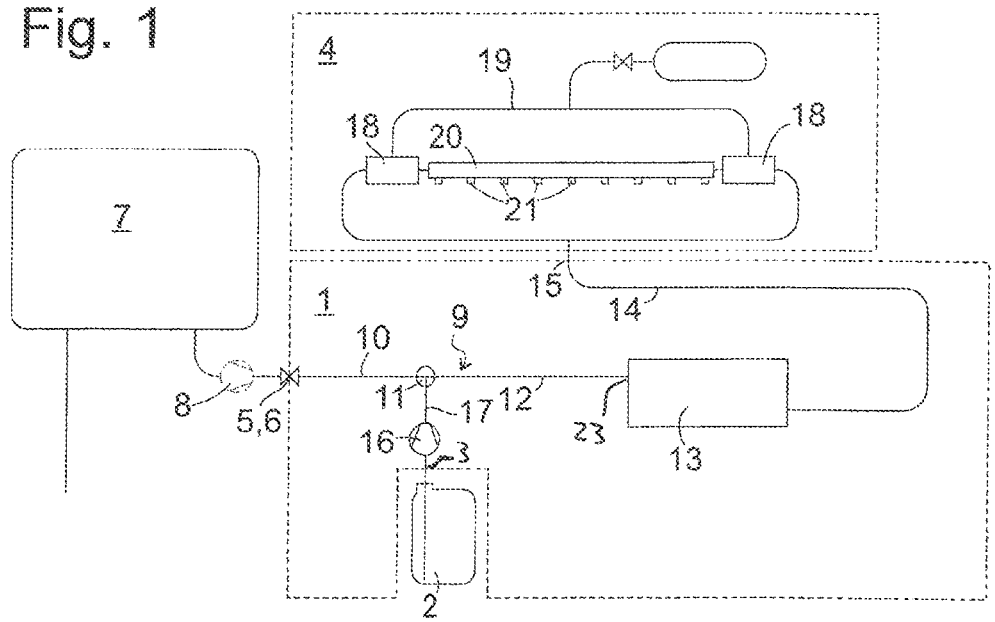
FIG. 1 a diagrammatic representation of a diluting device according to the present invention.
Figure 2:
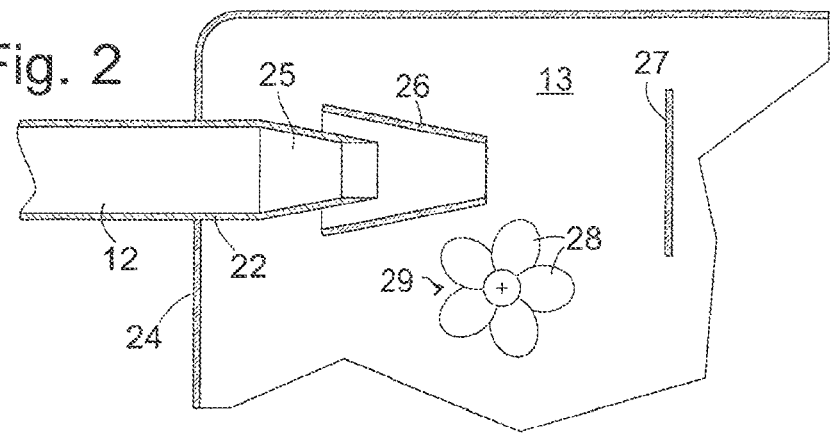
FIG. 2 a section through an entrance portion of the mixing container.

FIG. 1 shows a diagrammatic representation of a diluting device 1 in a vehicle wash facility. The diluting device 1 serves to dilute a detergent concentrate from a storage tank 2 with water so as to be able to foam the resulting diluted detergent solution in a foam generator 4 downstream of the diluting device 1 and to apply it to a vehicle that is to be washed.

A water inlet 5 of the diluting device 1 is connected via a shut-off valve 6 to a water tank 7. The water tank 7 can be an overhead tank of a public water supply system which maintains a constant water pressure of typically approximately 4 bar at the shut-off valve 6. However, the tank can also be a pressurized tank of a water treatment system of the vehicle wash facility. If the water tank 7 itself is unpressurized, a pump 8 can be disposed between said tank and the water inlet 5 so as to provide the positive pressure required to operate the diluting device 1 and the foam generator 4.

A line 9 of the diluting device 1 branching off the water inlet 5 sequentially comprises a first pipe section 10, a confluence 11, a second pipe section 12, a mixing container 13 and a third pipe section 14, which latter at the same time forms an outlet 15 to the foam generator 4. All of the pipe sections 10, 12, 14 can have the same cross section; the cross section of the mixing container 13 is multiple times larger than that of the pipe sections 10, 12. 14. A metering pump 16 is disposed between an inlet 3 for the concentrate, here, e.g., a hose immersed in the storage tank 2, and a branch line 17 which leads to the confluence 11. The metering pump 16 can be a piston pump which, although not pumping continuously, delivers a precisely defined amount of concentrate with each stroke of its piston. In this embodiment example, the clock frequency of the metering pump 16 is 1 Hz. However, in other embodiment examples, the clock frequency of the metering pump 16 can be in a range of 1 Hz to 10 Hz or a multiple of 10 Hz.

When the shut-off valve 6 is open and the metering pump 16 is operating, the water and the concentrate are mixed as they pass from the confluence 11 to the outlet 15, as will be explained in greater detail below. In a chamber 18 filled with granules or a porous, e.g., fibrous, material of the foam generator 4, the solution obtained is initially combined with a stream of compressed air 19. The foam being generated during passage through the granules is transported from the chamber 18 into a distributor pipe, 20 which extends at right angles across the vehicle (not shown in the figure) and flows out of nozzles 21 of the distributor pipe 20 over the vehicle.

As the solution enters the foam generator 4, its pressure must be at least as high as the pressure of the stream of compressed air 19. To maintain this pressure level, the line 9 is pressure-proof over its entire length. Along the line 9, the pressure decreases continuously from the water inlet 5 to the outlet 15, with the result that the metering pump 16 must work against the water pressure prevailing at the confluence 11.

This leads to transient phenomena, in particular when the diluting device is first placed in operation. While the water pressure on the upstream side of the shut-off valve 6 almost instantaneously spreads into the line 9 and water begins to flow through the line 9 as soon as this valve opens, the metering pump 16 must first accelerate against this pressure in order to reach a delivery rate sufficiently high to deliver the concentrate. This means that as long as the metering pump 16 has not yet reached its desired delivery rate, not enough concentrate is delivered to ensure that the solution has the desired concentration. However, as this extremely thin solution flows at a high velocity into the mixing container 13, it is mixed with solution which is left over from a previous application and which has the correct concentration, so that the deviation from the desired value of the concentration of the solution leaving the mixing container 13 is considerably smaller than that of the solution flowing into the container.

The volume of the mixing container 13 is correlated with the flow rate of the water, which ensues when a nominal operating pressure is applied to the water inlet 5. If the diluting device is supplied with tap water, this nominal pressure should be the usual line pressure of approximately 4 bar, at which water is supplied by the public water supply system. The volume of the mixing container 13 measures 5-12%, in particular 5-10%, of the amount of water that flows under nominal pressure per minute through the line 9. In other words, if mixing were not to take place, the water in the mixing container 13 would be completely replaced within a period of 3-6 s. The time that the metering pump 16 needs to reach the stationary delivery rate should be no longer than the time it takes to completely replace the water.

In the current embodiment example, the mixing container has a circular cylindrical shape. It is 30 cm long, its diameter measures 11.4 cm, and on the upstream end surface, the mixing container has an inlet opening with a diameter of 15 mm. Thus, the ratio of the length of the mixing container 13 to its maximum dimension in the transverse direction, i.e., in a direction at right angles relative to the axis of the cylindrical mixing container 13, is 2.6. In other embodiment examples, this ratio is in a range of 0.5 to 5.

On the downstream side, the end surface of the mixing container 13 has an outlet opening with the same diameter. However, the inlet opening and the outlet opening are not disposed centro-symmetrically with respect to the axis of the cylindrical mixing container 13, but at a distance from the axis and offset with respect to one another. In the current embodiment example, the inlet opening relative to the axis of the mixing container 13 is disposed opposite to the outlet opening. During operation of the device and during implementation of the method, the throughput, i.e., the volume of the water flow, in the line 9 measures 30 L/min at the confluence 11. Thus, the volume of the mixing container 13 is $$V = \frac{k \cdot D}{f},$$

wherein V stands for the volume of the mixing container 13, D stands for the throughput through the line 9 between the inlet 5 for the diluent and the confluence 11, in particular directly upstream of the confluence 11, and f stands for the clock frequency of the metering pump 16. The parameter k specifies how many pump surges are mixed into the mixing container 13. The parameter k is in a range from 1 to 15, in particular in a range from 4 to 8. In the current embodiment example, the value of the parameter k at a clock frequency of 1 Hz upstream of the metering pump equals 6, so that the mixing container 13 holds the equivalent of six pump surges as the concentrate is being metered in.

To ensure turbulent mixing of the inflowing and the already present solution in the mixing container 13, it may suffice if the cross section of line 9 abruptly changes in the transition from the pipe section 12 to the mixing container 13. Measures to increase the mixing efficiency include, inter alia:

a pipe connector 22, which, at the entrance to the mixing container 13 in extension of the pipe section 12, projects beyond a face wall 24 of the mixing container 13 into the inside of said container, a nozzle 25, which, at the end of the pipe section 12, narrows the cross section of said pipe section and thereby forces the solution to accelerate as it enters the mixing container, a jet pump 26, through which the entering solution flows and which at the same time takes in solution already present in the mixing container 13, a baffle plate 27 disposed at the entrance 23 to the mixing container so as to disperse the flow of the entering solution and/or an agitator vane 28 in the mixing container 13, here in the form a rotary-driven vane wheel 29.

Figure 3:
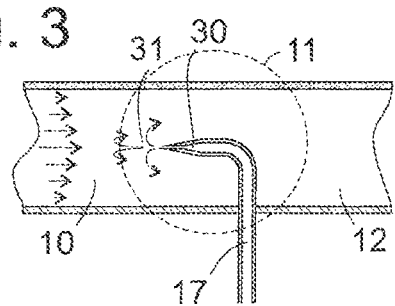
FIG. 3 a section through a confluence of water and concentrate.

Even after the metering pump 16 has reached its stationary delivery rate, homogeneous mixing of the concentrate with water may be prevented if the viscosity of the concentrate is high. As shown in a section in FIG. 3, to compensate for this problem, at the confluence 11, the branch line can empty via a nozzle 30 into the line 9, the flow direction of which is oriented opposite to the flow direction of the water. Here again, the large difference between the velocity of the water and the velocity of the concentrate jet 31 exiting the nozzle 30 causes turbulence, thereby ensuring that the concentrate is dispersed across a large portion of the cross section of the pipe section 12 and is highly diluted even before it reaches the mixing container.

Figure 4:
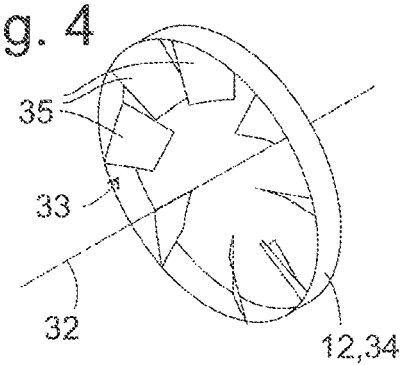
FIG. 4 a line section between the confluence and a mixing container.

Another method of promoting mixing of concentrate and water already in the pipe section 12 can be implemented in a portion of the pipe section 12 by means of a swirl generator 33, as shown in FIG. 4, here in the form of blades 35 that cause the liquid jet to rotate about the longitudinal axis 32 of the pipe section 12 and that are oriented at an oblique angle relative to the longitudinal axis 32 and project from an outside wall 34 of the pipe section 12 toward the longitudinal axis 32. In addition, a turbine wheel (not shown), with blades oriented in a direction opposite to that of the blades 35, can be disposed downstream of the swirl generator 33, and set into rotary motion by the liquid jet in the pipe section 12, which in turn drives the vane wheel 29.

LIST OF REFERENCE NUMBERS

1 Diluting device
2 Storage tank
3 Inlet for the concentrate
4 Foam generator
5 Inlet for water
6 Shut-off valve
7 Water tank
8 Pump
9 Line
10 Pipe section
11 Confluence
12 Pipe section
13 Mixing container
14 Pipe section
15 Outlet
16 Metering pump
17 Branch line
18 Chamber
19 Stream of compressed air
20 Distributor pipe
21 Nozzle
22 Pipe connector
23 Entrance
24 Face wall
25 Nozzle
26 Jet pump
27 Baffle plate
28 Agitator vane
29 Vane wheel
30 Nozzle
31 Jet of concentrate
32 Longitudinal axis
33 Swirl generator
34 Outside wall
35 Blade

The invention claimed is:

1. A vehicle wash facility device for producing a solution from a concentrate and a diluent, the device comprising:

an inlet for the diluent,
an inlet for the concentrate,
an outlet for the solution produced,
a line extending from the inlet for the diluent to the outlet via a confluence in the line at which the diluent and the concentrate converge,
a mixing container disposed in the line between the confluence and the outlet, the mixing container having a larger cross section than cross sections of the line upstream and downstream thereof,
a metering pump for delivering the concentrate connected on a suction side of the inlet for the concentrate and on a pressure side of the confluence, the metering pump configured for operating in a pulsed mode at a clock frequency, and
a foam generator downstream of the mixing container so that the solution is foamable prior to application to a vehicle that is to be washed, the foam generator including a chamber for receiving the solution from the outlet and combined with compressed air to foam the solution and a distributor pipe connected to the chamber and having at least one nozzle to apply the foamed solution to the vehicle that is to be washed,
wherein an interior space of the mixing container has a longitudinal dimension in a direction of flow and a transverse dimension in a direction at right angles to the direction of flow, and
wherein a ratio of a maximum longitudinal dimension of the mixing container to a maximum transverse dimension of the mixing container is in a range of 1 to 4.

2. The vehicle wash facility device of claim 1, wherein the inlet for the diluent is configured and arranged such that a defined throughput D is ensured in a section of the line between the inlet for the diluent and the confluence, a clock frequency f is assigned to the metering pump, a parameter k is in a range of 1 to 15, and a volume V of the mixing container is $$V = \frac{k \cdot D}{f}.$$

3. The vehicle wash facility device of claim 1, wherein the mixing container has a cylindrical shape, an inlet opening in an end surface in an upstream direction, and an outlet opening in an end surface in a downstream direction, the inlet opening and the outlet opening offset to one another relative to an axis of the mixing container.

4. The vehicle wash facility device of claim 1, wherein the line is pressure-proof.

5. The vehicle wash facility device of claim 1, wherein, at a predetermined nominal pressure at the inlet for the diluent, a throughput through the line per minute is a multiple of volume of the mixing container.

6. The vehicle wash facility device of claim 5, wherein the throughput through the line per minute is in a range between 10 and 20 times the volume of the mixing container.

7. The vehicle wash facility device of claim 1, wherein the clock frequency of the metering pump is in a range of 1 Hz to 10 Hz.

8. The vehicle wash facility device of claim 2, wherein the parameter k is in a range of 4 to 8.

9. The vehicle wash facility device of claim 3, wherein a ratio of a surface area of the inlet opening to a mean cross-sectional area of the mixing container is in a range of 1/30 to 1/200.

10. The vehicle wash facility device of claim 1, further comprising a shut-off valve disposed between the inlet for the diluent and the confluence.

11. The vehicle wash facility device of claim 1, wherein the inlet for the diluent is connected to a water supply system.

12. The vehicle wash facility device of claim 1, further comprising a storage tank for the concentrate removably connected to the inlet for the concentrate.

13. A vehicle wash facility comprising the vehicle wash facility claim 1.

14. A method for producing a solution from a concentrate and a diluent, the method comprising:
providing the vehicle wash facility device of claim 1,
feeding the diluent into the line via the inlet for the diluent,
forming a mixture of the diluent and the concentrate by metering the concentrate into the line containing the diluent at the confluence containing the diluent using the metering pump,
feeding the mixture of the diluent and the concentrate into a mixing container, and
foaming the solution produced in the mixing container by feeding the solution into the foam generator.

15. The method of claim 14, wherein the inlet for the diluent is configured and arranged such that a defined throughput D is ensured in a section of the line between the inlet for the diluent and the confluence, a clock frequency f is assigned to the metering pump, a parameter k is in a range of 1 to 15, and a volume V of the mixing container is $$V = \frac{k \cdot D}{f}.$$

16. The method of claim 15, wherein the parameter k is in a range of 4 to 8.

17. A vehicle wash facility device for producing a solution from a concentrate and a diluent, the device comprising:
an inlet for the diluent,
an inlet for the concentrate,
an outlet for the solution produced,
a line extending from the inlet for the diluent to the outlet via a confluence in the line at which the diluent and the concentrate converge,
a mixing container disposed in the line between the confluence and the outlet, the mixing container having a larger cross section than cross sections of the line upstream and downstream thereof,
a metering pump for delivering the concentrate connected on a suction side of the inlet for the concentrate and on a pressure side of the confluence, the metering pump a piston pump configured for operating via a pump surge in which a specific volume of the concentrate is metered into volume flow of the diluent in the line, and
a foam generator disposed downstream of the mixing container and configured such that the solution produced in the mixing container is foamed prior to application to a vehicle to be washed, the foam generator including a chamber for receiving the solution from the outlet and a stream of compressed air, a distributor pipe connected to the chamber, and at least one nozzle extending from the distributor pipe,
wherein foamed solution is generated in the chamber by mixing the solution with the compressed air, is transported into the distributor pipe, and is distributed over the vehicle to be washed by flowing through the at least one nozzle, wherein a plurality of pump surges is attributed to dwell time of liquid in the mixing container, wherein an interior space of the mixing container has a longitudinal dimension in a direction of flow and a transverse dimension in a direction at right angles to the direction of flow, and wherein a ratio of a maximum longitudinal dimension of the mixing container to a maximum transverse dimension of the mixing container is in a range of 1 to 4.

18. A method for producing a solution from a concentrate and a diluent, the method comprising:

providing the vehicle wash facility device of claim 17, feeding the diluent into the line via the inlet for the diluent, forming a mixture of the diluent and the concentrate by metering the concentrate into the line containing the diluent at the confluence containing the diluent using the metering pump, and feeding the mixture of the diluent and the concentrate into a mixing container.

\* \* \* \* \*